United States Patent
Garner et al.

(10) Patent No.: US 12,425,072 B2
(45) Date of Patent: Sep. 23, 2025

(54) PROVING PHYSICAL POSSESSION OF INTERNET-OF-THINGS (IOT) DEVICES

(71) Applicant: ROKU, INC., San Jose, CA (US)

(72) Inventors: Gregory Mack Garner, Key Colony Beach, FL (US); David L Stern, Los Gatos, CA (US); David A. Westerhoff, Pleasanton, CA (US)

(73) Assignee: Roku, Inc., San Jose, CA (US)

( * ) Notice: Subject to any disclaimer, the term of this patent is extended or adjusted under 35 U.S.C. 154(b) by 554 days.

(21) Appl. No.: 17/822,827

(22) Filed: Aug. 29, 2022

(65) Prior Publication Data

US 2023/0116654 A1    Apr. 13, 2023

Related U.S. Application Data

(62) Division of application No. 17/500,005, filed on Oct. 13, 2021, now Pat. No. 11,463,130.

(51) Int. Cl.
| H04B 5/02 | (2006.01) |
| G06F 21/32 | (2013.01) |
| G06F 21/35 | (2013.01) |
| H04B 5/48 | (2024.01) |
| H04B 5/70 | (2024.01) |

(Continued)

(52) U.S. Cl.
CPC ............... H04B 5/70 (2024.01); H04B 5/48 (2024.01); *G16Y 30/00* (2020.01)

(58) Field of Classification Search
None
See application file for complete search history.

(56) References Cited

U.S. PATENT DOCUMENTS

| 8,452,961 B2 * | 5/2013 | Song ................. H04L 63/08 713/170 |
| 8,935,633 B2 * | 1/2015 | Bush ................. G06Q 10/1095 715/810 |

(Continued)

OTHER PUBLICATIONS

International Search Report and Written Opinion directed to related International Application No. PCT/US2022/075320, mailed Dec. 20, 2022; 8 pages.

*Primary Examiner* — Tuan A Tran
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for determining physical possession of one or more IoT devices. According to some embodiments, a method for determining physical possession of a plurality of Internet-of-Things (IoT) devices includes determining physical possession of a first IoT device of the plurality of IoT devices. The method further includes determining whether the first IoT device with the determined physical possession satisfies a condition. In response to determining that the first IoT device with the determined physical possession does not satisfy the condition, determining physical possession of a second IoT device of the plurality of IoT devices. In response to determining that the first IoT device with the determined physical possession satisfies the condition, determining the physical possession of the plurality of IoT devices based on the determined physical possession of the first IoT device.

20 Claims, 9 Drawing Sheets

(51) Int. Cl.
*H04W 4/029* (2018.01)
*H04W 4/70* (2018.01)
*G16Y 30/00* (2020.01)

(56) References Cited

U.S. PATENT DOCUMENTS

| | | | | |
|---|---|---|---|---|
| 9,696,336 | B2 * | 7/2017 | Jain | G01P 15/18 |
| 9,706,406 | B1 * | 7/2017 | Adams | G06F 21/32 |
| 9,803,971 | B2 * | 10/2017 | Wang | G01B 7/14 |
| 10,187,754 | B1 * | 1/2019 | Hansen | H04L 9/3297 |
| 10,320,779 | B2 * | 6/2019 | Derakhshani | H04L 63/0861 |
| 10,452,831 | B2 * | 10/2019 | Flautner | G06F 21/34 |
| 10,630,681 | B2 * | 4/2020 | Derakhshani | H04W 12/12 |
| 10,666,440 | B2 * | 5/2020 | Ren | G06F 21/33 |
| 10,911,953 | B2 * | 2/2021 | Ueki | H04B 1/3822 |
| 10,951,430 | B2 * | 3/2021 | Fahrendorff | H04L 12/1818 |
| 10,956,607 | B2 * | 3/2021 | Rajashekaraiah | G06F 21/6245 |
| 11,003,752 | B2 * | 5/2021 | Gupta | G06F 21/35 |
| 11,017,069 | B2 * | 5/2021 | Robinson | G06F 21/35 |
| 11,017,370 | B2 * | 5/2021 | Buchholtz | G06Q 20/425 |
| 11,044,611 | B2 * | 6/2021 | Alameh | H04W 12/30 |
| 11,047,876 | B2 * | 6/2021 | Jain | G06Q 30/0201 |
| 11,089,475 | B2 * | 8/2021 | Reimann | H04W 12/63 |
| 11,093,626 | B2 * | 8/2021 | Lakhani | G06F 21/35 |
| 11,106,774 | B2 * | 8/2021 | Flautner | H04W 12/068 |
| 11,134,385 | B2 * | 9/2021 | Ziraknejad | H04W 4/02 |
| 11,140,157 | B1 * | 10/2021 | Xia | H04L 63/0853 |
| 11,217,051 | B2 * | 1/2022 | Masood | G07C 9/257 |
| 11,284,236 | B2 * | 3/2022 | Alameh | H04W 4/022 |
| 11,463,130 | B1 | 10/2022 | Garner et al. | |
| 11,828,769 | B2 * | 11/2023 | Jain | G01P 15/18 |
| 12,185,105 | B2 * | 12/2024 | Ohashi | H04W 12/06 |
| 2012/0191016 | A1 * | 7/2012 | Jastram | A61B 5/1117 |
| | | | | 600/595 |
| 2017/0372055 | A1 * | 12/2017 | Robinson | H04W 12/104 |
| 2018/0270904 | A1 | 9/2018 | Swengler | |
| 2019/0158470 | A1 | 5/2019 | Wright et al. | |
| 2020/0267017 | A1 | 8/2020 | Milea et al. | |
| 2021/0209579 | A1 | 7/2021 | Leong et al. | |
| 2021/0279320 | A1 * | 9/2021 | Robinson | H04L 63/0853 |
| 2021/0294886 | A1 * | 9/2021 | Takeuchi | G06F 21/35 |
| 2021/0322829 | A1 * | 10/2021 | Kennedy | A63B 24/0084 |
| 2021/0350013 | A1 * | 11/2021 | Lakhani | H04L 63/0853 |
| 2021/0357490 | A1 * | 11/2021 | Flautner | G06F 21/33 |
| 2021/0357491 | A1 * | 11/2021 | Teller | H04W 12/33 |

\* cited by examiner

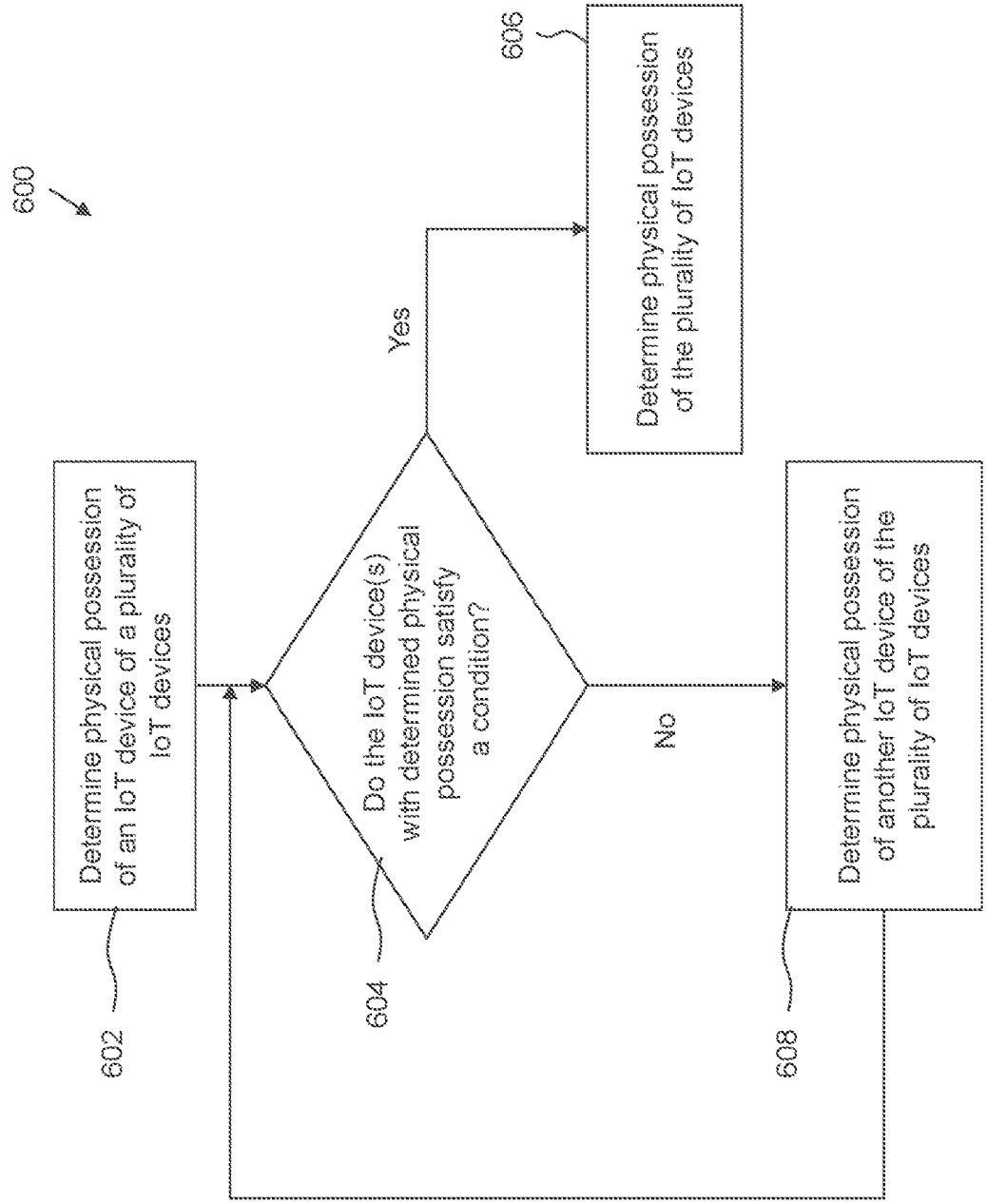

PROVING PHYSICAL POSSESSION OF INTERNET-OF-THINGS (IOT) DEVICES

CROSS-REFERENCE TO RELATED APPLICATIONS

This application is a divisional of U.S. patent application Ser. No. 17/500,005, filed Oct. 13, 2021, which is herein incorporated by reference in its entirety.

BACKGROUND

Field

This disclosure is generally directed to Internet-of-Things (IoT) devices, and more particularly to embodiments for proving physical possession of IoT devices.

Background

For a user of an IoT device to be able to configure and/or control the IoT device, the user often must prove ownership of the IoT device. In some examples, physical possession of the IoT device by the user can establish ownership of the IoT device by the user. In some IoT devices, one approach for proving physical possession can include using a physical button on the IoT device. When the user presses and holds the physical button for a given period of time, the IoT device resets to a factory-reset state. After that operation, the first messages to arrive at the IoT device will be trusted by the IoT device to communicate the identity of the owner.

However, as discussed in more detail below, there may be different states or levels of ownership and/or physical possession. Each level of ownership and/or physical possession can have different requirements to prove physical possession.

SUMMARY

Provided herein are system, apparatus, article of manufacture, method and/or computer program product embodiments, and/or combinations and sub-combinations thereof, for determining and/or proving physical possession of one or more IoT devices.

According to some embodiments, a computer implemented method for determining physical possession of a plurality of Internet-of-Things (IoT) devices includes determining physical possession of a first IoT device of the plurality of IoT devices. The method further includes determining whether the first IoT device with the determined physical possession satisfies a condition. In response to determining that the first IoT device with the determined physical possession does not satisfy the condition, determining physical possession of a second IoT device of the plurality of IoT devices. In response to determining that the first IoT device with the determined physical possession satisfies the condition, determining the physical possession of the plurality of IoT devices based, at least, on the determined physical possession of the first IoT device.

In some embodiments, in response to determining that the first IoT device with the determined physical possession does not satisfy the condition, the method further includes determining whether the second IoT device with the determined physical possession satisfies the condition. In response to determining that the second IoT device with the determined physical possession satisfies the condition, determining the physical possession of the plurality of IoT devices based on the determined physical possession of the second IoT device.

In some embodiments, determining the physical possession of the first IoT device includes transmitting, using the first IoT device, a first radio frequency (RF) packet to a user device, receiving, using the first IoT device, a second RF packet from the user device, and determining the physical possession of the first IoT device based on the second RF packet received from the user device.

In some embodiments, determining the physical possession of the first IoT device includes transmitting, using the first IoT device, a first near-field communication (NFC) packet to a user device, receiving, using the first IoT device, a second NFC packet from the user device, and determining the physical possession of the first IoT device based on the second NFC packet received from the user device.

In some embodiments, determining the physical possession of the first IoT device includes receiving, using the first IoT device, a signal from a user device, determining, using the first IoT device, information associated with the received signal, and comparing, using the first IoT device, the determined information with predetermined information. The method further includes determining the physical possession of the first IoT device based on the determined information matching with the predetermined information. In some examples, the signal includes at least one of an audio signal, a visible light signal, an infrared light signal, or a laser signal.

In some embodiments, determining the physical possession of the first IoT device includes determining location information associated with the first IoT device, determining location information associated with a user associated with the first IoT device, and comparing the location information associated with the first IoT device and the location information associated with the user. The method further includes determining the physical possession of the first IoT device in response to the location information associated with the first IoT device matching the location information associated with the user.

In some embodiments, determining the physical possession of the first IoT device includes capturing, using the first IoT device, an image displayed on a user device, comparing, using the first IoT device, the captured image with a predetermined image, and determining the physical possession of the first IoT device based on the captured image matching with the predetermined image.

In some embodiments, determining the physical possession of the first IoT device includes measuring, using the first IoT device, an acceleration force applied to the first IoT device and determining the physical possession of the first IoT device based on the measured acceleration force.

In some embodiments, determining the physical possession of the first IoT device includes emitting, using the first IoT device, a first signal generated based on a predetermined code, receiving, using the first IoT device, a second signal, and determining, using the first IoT device, a code from the second signal. The method further includes comparing the determined code with the predetermined code and determining the physical possession of the first IoT device based on the determined code matching with the predetermined code.

According to some embodiments, a non-transitory computer-readable medium includes instructions stored thereon that, when executed by at least one computing device, cause the at least one computing device to perform operations for determining physical possession of a plurality of Internet-of-Things (IoT) devices. The operations include determining physical possession of a first IoT device of the plurality of IoT devices. The operations further include determining whether the first IoT device with the determined physical possession satisfies a condition. In response to determining that the first IoT device with the determined physical possession does not satisfy the condition, determining physical possession of a second IoT device of the plurality of IoT devices. In response to determining that the first IoT device with the determined physical possession satisfies the condition, determining the physical possession of the plurality of IoT devices based, at least, on the determined physical possession of the first IoT device.

According to some embodiments, an Internet-of-Things (IoT) device includes a transceiver configured to communicate over a wireless network and a physical possession determining system. The physical possession determining system is configured to determine physical possession of the IoT device using at least one of transmitting a first signal to a user device, the first signal generated based on predetermined information shared between the IoT device and the user device or receiving a second signal from the user device, the second signal generated based on the predetermined information shared between the IoT device and the user device.

In some embodiments, the IoT device further includes a magnetic detector configured to detect a presence of a magnet to determine the physical possession of the IoT device.

In some embodiments, the first signal includes a first radio frequency (RF) packet and the second signal includes a second RF packet. The physical possession determining system is configured to determine the physical possession of the IoT device based on the second RF packet received from the user device.

In some embodiments, the second signal includes at least one of an audio signal, a visible light signal, an infrared light signal, or a laser signal. The physical possession determining system is further configured to determine information associated with the second signal, compare the information associated with the second signal with the predetermined information, and determine the physical possession of the IoT device based on the information associated with the second signal matching with the predetermined information.

In some embodiments, the IoT device further includes one or more buttons. The physical possession determining system is configured to determine that the one or more buttons are actuated in a predetermined manner and determine the physical possession of the IoT device based on the determination that the one or more buttons are actuated in the predetermined manner.

In some embodiments, the IoT device further includes a location detection device configured to determine location information associated with the IoT device. The physical possession determining system is configured to determine location information associated with a user associated with the IoT device, compare the location information associated with the IoT device and the location information associated with the user, and determine the physical possession of the IoT device in response to the location information associated with the IoT device matching the location information associated with the user.

In some embodiments, the physical possession determining system is configured to determine that a power supply associated with the IoT device turned off and on in a predetermined manner and determine the physical possession of the IoT device in response to the determination that the power supply associated with the IoT device turned off and on in the predetermined manner.

In some embodiments, the physical possession determining system is configured to receive a request for identifying the IoT device and activate at least one of a light source of the IoT device, a speaker of the IoT device, a near-field communication (NFC) transceiver of the IoT device, or a radio frequency (RF) transceiver of the IoT device.

BRIEF DESCRIPTION OF THE FIGURES

The accompanying drawings are incorporated herein and form a part of the specification.

FIG. 6 illustrates an example method for determining physical possession of a plurality of IoT devices, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for determining and/or proving physical possession of one or more IoT devices.

Figure 1:
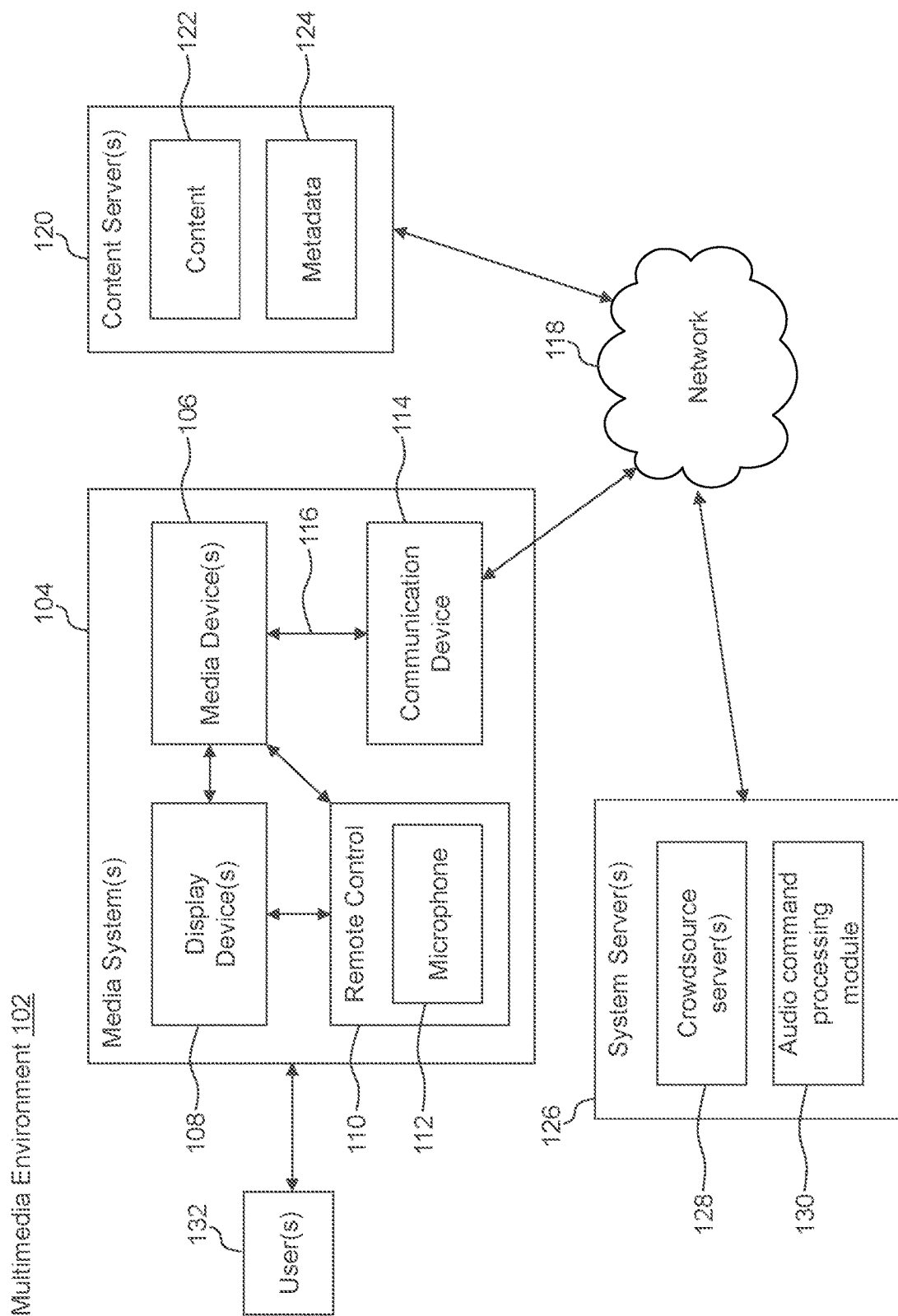
FIG. 1 illustrates a block diagram of a multimedia environment, according to some embodiments.

Various embodiments of this disclosure may be implemented using and/or may be part of a multimedia environment 102 shown in FIG. 1. For example, multimedia environment 102 can include or support one or more IoT devices. Multimedia environment 102 can further support proving physical possession of the one or more IoT devices. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. For example, IoT environment 300 of FIG. 3 can implement various embodiments of this disclosure. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, Internet-of-Things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (for example, a wireless local area network (WLAN) such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
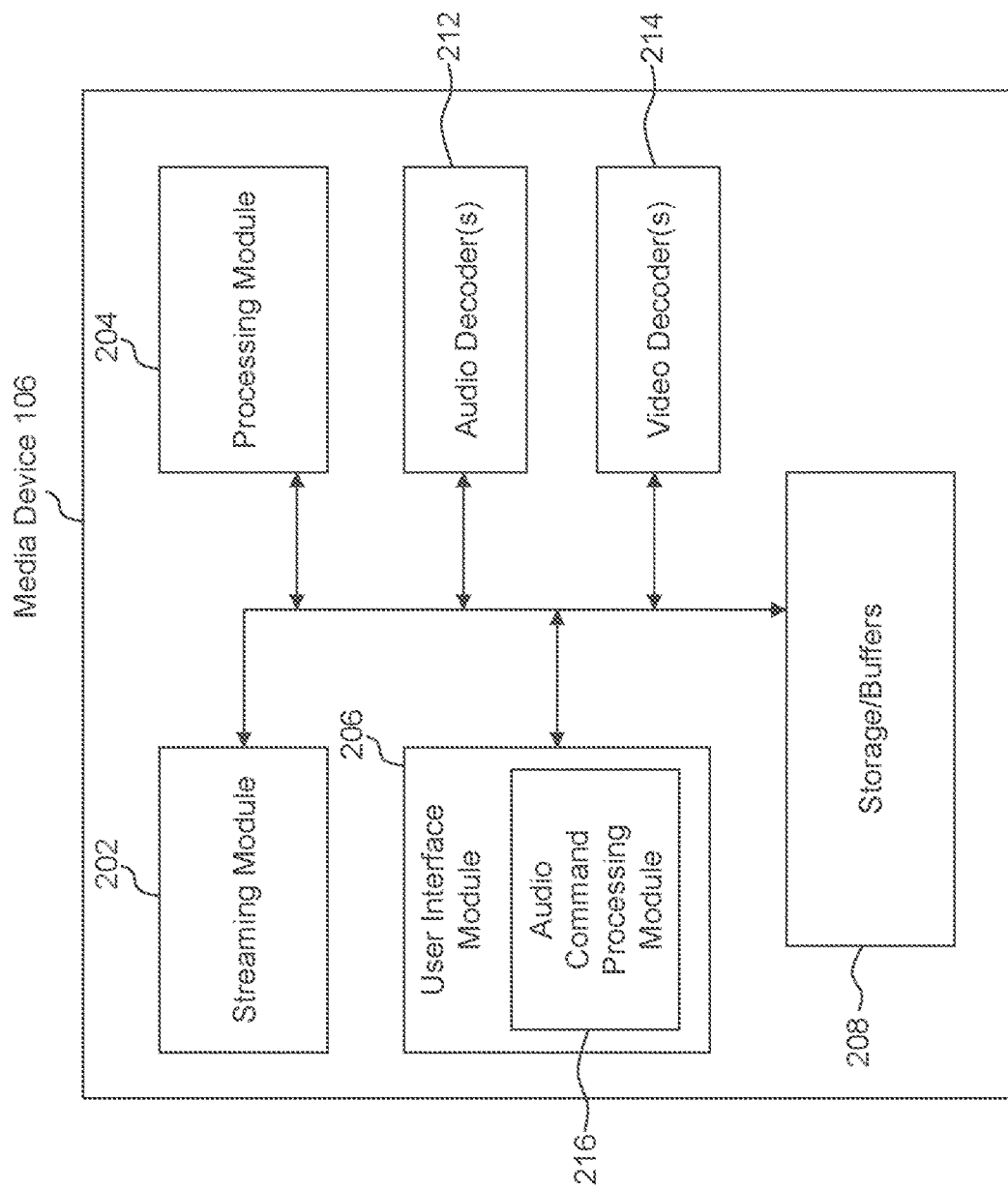
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206.

As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Exemplary IoT Environment

Figure 3:
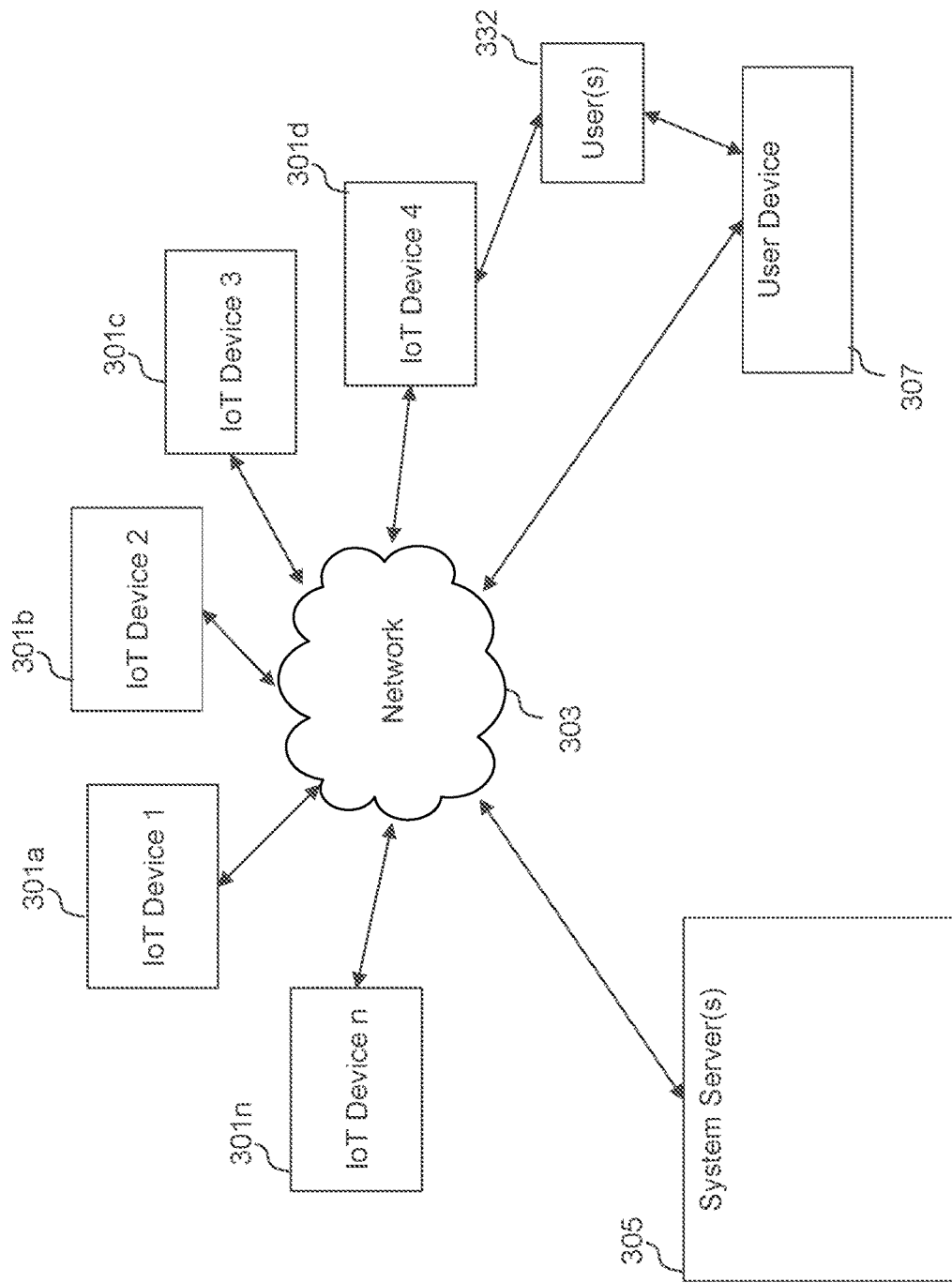
FIG. 3 illustrates a block diagram of an IoT environment, according to some embodiments.

FIG. 3 illustrates a block diagram of an IoT environment 300, according to some embodiments. According to some embodiments, IoT environment 300 can be implemented with multimedia environment 102 of FIG. 1. For example, multimedia environment 102 of FIG. 1 can be part of IoT environment 300 or vice versa.

According to some embodiments, IoT environment 300 can include a plurality of IoT devices 301a-301n, network 303, one or more system servers 305, and user device 307. According to some embodiments, IoT devices 301a-301n can be connected to, and communicate with, each other using a mesh network. In this example, when an IoT device leaves the plurality of IoT devices 301a-301n and/or an IoT device is added to the plurality of IoT devices 301a-301n, the mesh network can be updated accordingly. In one example, network 303 can be the mesh network connecting the plurality of IoT devices 301a-301n.

The mesh network can be part of network 303. For example, IoT devices 301a-301n (collectively referred to as IoT devices 301) can be connected to each other (e.g., communicate with each other) using the mesh network. The mesh network can be implemented using a wireless local area network (WLAN) such as WiFi. However, the embodiments of this disclosure are not limited to this example, and the mesh network can be implemented using other types of wireless and/or wired networks. In some examples, network 303 can include the mesh network and another wireless and/or wired networks. In various embodiments, network 303 can include, without limitation, mesh, wired and/or wireless intranet, extranet, Internet, cellular, Bluetooth, infrared, and/or any other short range, long range, local, regional, global communications mechanism, means, approach, protocol and/or network, as well as any combination(s) thereof.

According to some embodiments, IoT environment 300 can include one or more system servers 305. System servers 305 may operate to support IoT devices 301. In some examples, system servers 305 may operate to support IoT devices 301 from a cloud. It is noted that the structural and functional aspects of system servers 305 may wholly or partially exist in the same or different systems. According to some embodiments, IoT devices 301 can communicate with system servers 305 through network 303. In some examples, system servers 305 can be associated with system servers 126 of FIG. 1. For example, the structural and functional aspects of system servers 305 may wholly or partially exist in the same or different ones of the system servers 126.

According to some embodiments, system servers 305 can include one or more user accounts associated with IoT devices 301 and/or their associated network 303. In a non-limiting example, IoT devices 301 can include IoT devices associated with a physical property of user 332 on one network 303. In this example, IoT devices 301 and network 303 can be associated with the user account of user 332. In another non-limiting example, user 332 can have two physical properties where each physical property has its associated IoT devices and network. In this example, the IoT devices and networks are associated with the user account of user 332. However, the user account can include information indicating which IoT devices and which networks are associated with which of the two user properties.

IoT environment 300 can also include one or more user devices 307. According to some embodiments, user device 307 can be any of a personal digital assistant (PDA), desktop workstation, laptop or notebook computer, netbook, tablet, smart phone, smart watch or other wearable appliance, to name a few non-limiting examples, or any combination thereof. In some examples, a user (e.g., user 332) can prove physical possession of one or more of IoT devices 301 using user device 307. Additionally, or alternatively, user 332 can control and/or configure one or more IoT devices 301 using user device 307. For example, IoT device 301 can use radio frequency (RF) signals (e.g., using WLAN) to receive configuration and/or control information from user device 307.

Various embodiments of this disclosure are directed to proving physical possession (and therefore ownership) of IoT device 301 so user device 307 can configure and/or control IoT device 301. Additionally, or alternatively, some embodiments of this disclosure are directed to securely adding IoT devices without needing to manually set up each one of the IoT devices. Also, some embodiments of this disclosure are directed to securely transferring ownership of IoT devices to another user and/or user account. Also, some embodiments of this disclosure are directed to determining/proving possession of a subset of a plurality of IoT devices to determine/prove possession of the plurality of IoT devices.

IoT devices 301 can include any IoT device. As some non-limiting examples, IoT devices 301 can include smart appliances such as, but no limited to, smart TVs, smart refrigerators, smart washers, smart dryers, smart dishwashers, smart ovens and gas tops, smart microwaves, smart heating, ventilation, and air conditionings (HVACs), smart fans, smart blinds, or the like. As other non-limiting examples, IoT devices 301 can include smart home security systems, smart locks, smart fire alarms/systems, or the like. IoT devices 301 can include sensors used in homes, offices, factories, medical sensors, fitness sensors/trackers, or the like. It is noted that although some embodiments of this disclosure are discussed with respect to some exemplary IoT devices, the embodiments of this disclosure are not limited to these examples and can be applied to other IoT devices.

According to some embodiments, IoT environment 300 can be used for determining and/or proving physical possession of one or more IoT devices 301. According to some embodiments, by proving physical possession of, for example, IoT device 301a, a user can establish ownership of IoT device 301n as well as IoT device 301a, and/or the rest of IoT devices 301. In other words, an owner of IoT device 301 can be the user who has the physical possession of IoT device 301, according to some embodiments. As the owner of IoT device 301, the user can configure and control IoT device 301, in some embodiments. Additionally, or alternatively, as the owner of IoT device 301, the user can control who else can access IoT device 301. As discussed in more detail below, a user (e.g., user 332) can use user device 307 with IoT device 301 (and/or system servers 305) to prove physical possession of IoT device 301, according to some embodiments. Additionally, or alternatively, the user (e.g., user 332) can operate on IoT device 301 to prove physical possession of IoT device 301.

There may be different states or levels of physical possession. Each starting state may have different requirements for proving physical possession. Some non-limiting examples of starting physical possession states and implications about that starting states are discussed below.

An exemplary starting physical possession state on an IoT device 301 can be a factory default state. This state can imply that the first user who tries to possess IoT device 301 may need less security than otherwise needed. In this example, using a Quick Response (QR) code (as a non-limiting example) can be enough for proving physical possession of IoT device 301.

Another exemplary starting physical possession state can be previously possessed by a first owner but the first owner gave up possession of IoT device 301. In this example, similar to factory default state example, lower threshold for proving physical possession of IoT device 301 can be used. For example, if the first owner sells IoT device 301 to a second user, the second user can prove ownership and physical possession with lower threshold of requirements.

Another exemplary starting physical possession state can be currently possessed and recently used. In this example, a higher (e.g., a highest) level of proving possession can be used as this state can be one of the most likely states to be hacked. According to some embodiments, a combination of physical possession proofs and/or high (e.g., highest) security possession proofs can be used.

Another exemplary starting physical possession state can be currently possessed but not accessed in a long time (e.g., a period of time more than a threshold time). In this example, a lower level of proving possession can be used. A non-limiting example of this state can include IoT device 301 in a house, where the house is sold to a new owner without active transfer of IoT device 301.

Another exemplary starting physical possession state can be a state where IoT device 301 has just been installed by an installer, and is awaiting an owner to possess IoT device 301, but the possession has not been actively transferred by the installer. This state can also use a lower (or a medium) level of proving possession.

Another exemplary starting physical possession state can be a state where IoT device 301 has just been installed by an installer, and the installer transferred possession of IoT device 301 to a new owner via active means. In a non-limiting example, an email can be used to prove physical possession by the new owner.

Another exemplary starting physical possession state can be a state where IoT device 301 is possessed by an owner but is marked as a rental device. In a non-limiting example, IoT device 301 can be in a house that is owned by the owner and is rented to a renter. In this exemplary starting state, lower requirements for physical possession by the renter can be used. However, the requirements can also allow the owner to remove possession of the renter, according to some embodiments. In some examples, the ownership can be transferred using, for example, an email. Additionally, or alternatively, other mechanisms can be used for transferring ownership. In some examples, the requirements for transferring ownership can also include mechanisms for transferring ownership between renters without the owner's assistance. In a non-limiting example, the owner can set a possession timer length (for example, but not limited to, 1 day, 7 days, 30 days, etc.) for IoT device 301. Therefore, if a first renter has not accessed IoT device 301 for the possession timer length, the ownership can be transferred to the owner and/or to a second renter. In some examples, a higher level of proving possession can be used for transferring ownership to the second renter. Additionally, or alternatively, the requirement may not allow a previous owner to be deleted.

Another exemplary starting physical possession state can be a state where IoT device 301 is possessed by an owner and is marked as a short-time rental (e.g., a hotel and/or a special case of rental discussed above). In some examples, the ability for a user to physically possess IoT device 301 to take it over can be disabled. In a non-limiting example, a user in the hotel will not be able to take over IoT device 301 even though the user has physical possession.

Another exemplary starting physical possession state can be transfer of ownership from one owner to a new owner using active means. In a non-limiting example, receiving a transfer email can be used to transfer physical possession. In a non-limiting example, if the new owner does not claim the transfer, the old owner can take back the possession.

Another exemplary starting physical possession state can be forced transfer of possession from server side (e.g., system servers 305). In this example, system servers 305 can use mechanisms to over-ride possession of IoT device 301.

According to some embodiments, if a user sets IoT device 301 (e.g., using user device 307) into a mode that allows taking possession, but then the user does not take possession, IoT device 301 can timeout (after a threshold period of time) and go back into the previous possession mode IoT device 301 was in.

Figure 4:
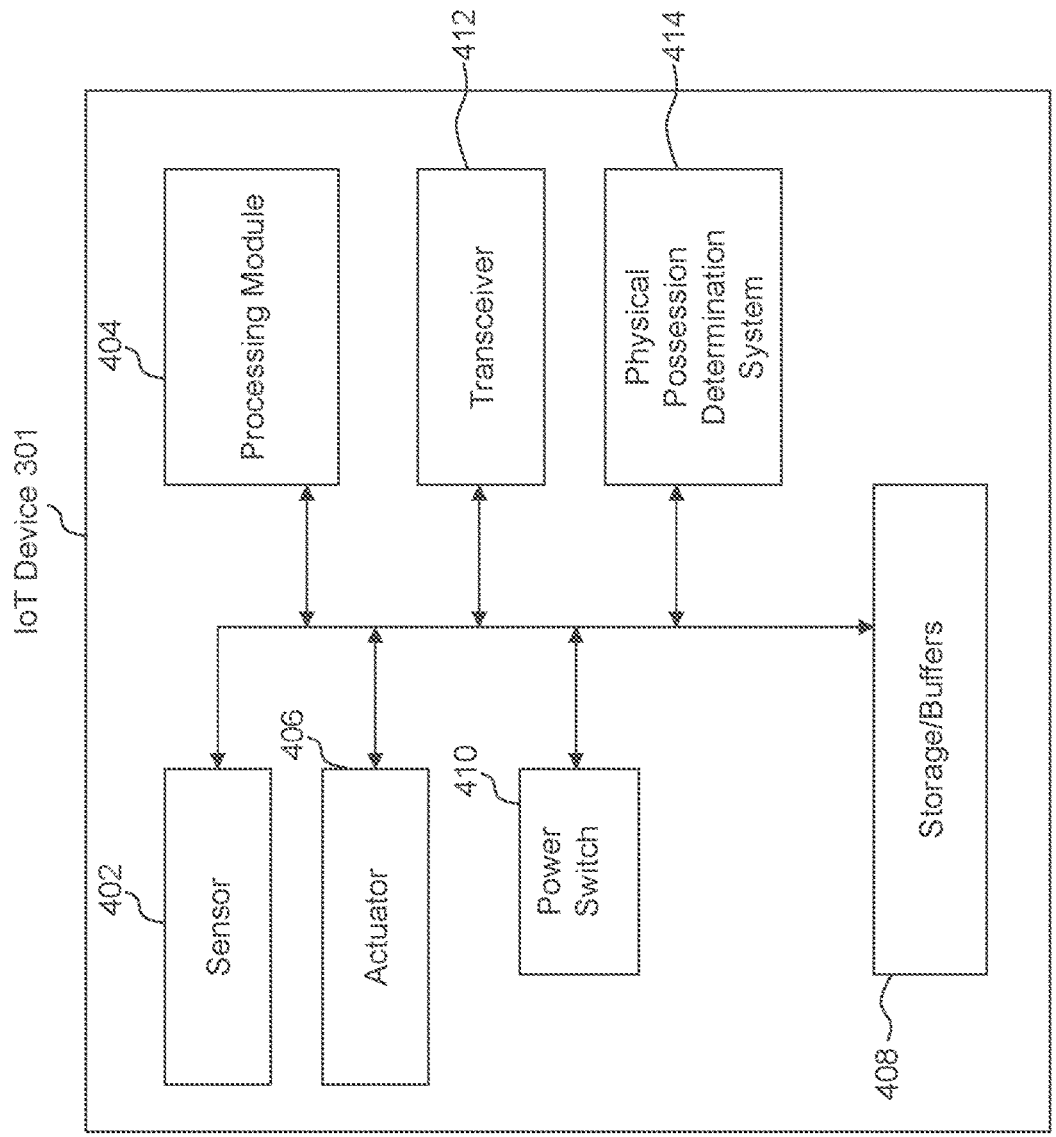
FIG. 4 illustrates a block diagram of an example IoT device 301, according to some embodiments.

FIG. 4 illustrates a block diagram of an example IoT device 301, according to some embodiments. IoT device 301 may include one or more sensors 402, processing module 404, one or more actuators 406, storage/buffers 408, power switch 410, transceiver 412, and physical possession determination system 414, according to some embodiments. Although not shown, IoT device 301 can also include a user interface module for interfacing with a user (e.g., user 332 of FIG. 3). It is noted that IoT device 301 can include more or fewer systems. Also, the structural and functional aspects of the systems in IoT device 301 may wholly or partially exist in the same or different ones of these system.

According to some embodiments, sensor 402 of IoT device 301 can be configured to measure one or more parameters in IoT environment 300 of FIG. 3. Depending on the structural and functional aspects of IoT device 301, IoT device 301 can include one or more sensors 402. Similarly, depending on the structural and functional aspects of IoT device 301, IoT device 301 can include one or more actuators to perform one or more operations within IoT environment 300 of FIG. 3. In some embodiments, the operations performed by actuator 406 can be based on the parameter(s) measured by sensor 402.

According to some embodiments, processing module 404 can be configured to control operations of sensor 402 and actuator 406. Additionally, or alternatively, processing module 404 can be configured to control the communication between IoT device 301 with system servers 305 and/or user device 307. Processing module 404 can also be configured to receive control and configuration information for IoT device 301 and implement these control and configuration information.

In some examples, control information, configuration information, physical possession information, and/or ownership information can be stored in storage/buffers 408. For example, storage/buffers 408 can store information associated with a user account associated with the user and/or the owner of IoT device 301. Additionally, or alternatively, storage/buffers 408 can store information associated with network 303. Information associated with network 303 can include, but are not limited to, identifier of network 303, password for network 303, identifiers of devices coupled to network 303, or the like. Storage/buffers 408 can store other information, data, and/or instructions used for operating IoT device 301

According to some embodiments, processing module 404 operates with physical possession determination system 414 to determine physical possession and/or ownership of IoT device 301. As discussed in more detail below, physical possession determination system 414 can be configured to interact with a user (e.g., user 332 of FIG. 3) and/or user device 307 to determine physical possession and/or ownership of IoT device 301. In some examples, physical possession determination system 414 can be part of processing module 404. Additionally, or alternatively, physical possession determination system 414 can include one or more processors to implement functions and structures of physical possession determination system 414.

IoT device 301 can include one or more transceivers 412. Transceiver 412 can include processors, controllers, radios, sockets, plugs, buffers, and like circuits/devices used for connecting to and communicating on networks. In some examples, transceivers 412 can include one or more of a cellular subsystem, a WLAN subsystem, a Bluetooth™ subsystem, a near-field communication (NFC), or the like. Transceivers 412 can include one or more circuits to enable connection(s) and communication based on, for example, Bluetooth™ protocol (or similar protocols). Additionally, or alternatively, transceiver 412 can include one or more circuits to enable connection(s) and communication over WLAN networks such as, but not limited to, networks based on standards described in IEEE 802.11. For example, transceivers 412 can include one or more circuits to enable communication over mesh networks. Transceiver 412 enables IoT device 301 to communicate with other IoT devices, with system servers 305, and/or user device 307. For example, transceiver 412 enables IoT device 301 to communicate with other IoT devices, with system servers 305, and/or user device 307 using network 303 of FIG. 3.

IoT device 301 can include power switch 410 for turning on and off IoT device 301. According to some embodiments, one embodiment to prove physical possession of IoT device 301 can include turning off and on the power to IoT device 301 multiple times. For example, a user (e.g., user 332 of FIG. 3) can use power switch 410 of IoT device 301 to turn off and on the power to IoT device 301 multiple times. Additionally, or alternatively, the user can use other embodiments to turn off and on a power supply to IoT device 301 multiple times. According to some embodiments, physical possession determination system 414 can track the number of off/on cycles and/or a duration for each off/on cycle. Physical possession determination system 414 can compare the number of off/on cycles and/or the duration for each off/on cycle with respective conditions. If physical possession determination system 414 determines that the one or more of the conditions are satisfied, physical possession determination system 414 can determine that a user has physical possession of IoT device 301. Additionally, or alternatively, physical possession determination system 414 can enter IoT device 301 in to a pairing mode in response to the one or more of the conditions being satisfied.

In a non-limiting example, physical possession determination system 414 can compare the duration of the off/on cycles with a first threshold. If the duration is less than the threshold, physical possession determination system 414 can determine that a user is trying to establish physical possession. Additionally, or alternatively, physical possession determination system 414 can compare the number of off/on cycles with a second threshold. In a non-limiting example, the second threshold can be three. However, the embodiments of this disclosure can include any number. If the number of off/on cycles is equal to or more than the second threshold, physical possession determination system 414 can determine that the user has physical possession of IoT device 301. In this example, physical possession determination system 414 can determine that the user has physical possession of IoT device 301. Additionally, or alternatively, physical possession determination system 414 can enter IoT device 301 into a pairing mode such that IoT device 301 can pair with, for example, user device 307 of the user.

In one example, if physical possession determination system 414 enters IoT device 301 into the pairing mode but no pairing occurs, physical possession determination system 414 can stop the pairing mode after a specific time period and return IoT device 301 in a previously paired mode.

In some examples, IoT device 301 can use different pairing modes. Each pairing mode can be associated with a threshold of number of off/on cycles. Physical possession determination system 414 can determine a specific pairing mode based on the number of off/on cycles that physical possession determination system 414 counts and the respective threshold.

According to some embodiments, an example embodiment to prove physical possession of IoT device 301 can include turning off and on IoT device 301 once, along with communication through user device 307. In a non-limiting example, IoT device 301 can establish connection and communication with user device 307 through, for example, transceiver 412. In some examples, the connection can be based on a Bluetooth™ connection. Additionally, or alternatively, the connection can be based on a WLAN connection. To determine physical possession of IoT device 301, physical possession determination system 414 can send a message to user device 307 for the user of user device 307 to turn off and on the power to IoT device 301 once (or multiple times). After sending the message, physical possession determination system 414 can determine whether IoT device 301 is turned off and on in response to, and based on, the message sent to user device 307. If physical possession determination system 414 determines that the instructions in the message were satisfied, physical possession determination system 414 can determine that the user of user device 307 has physical possession of IoT device 301.

According to some embodiments, in addition to, or in alternative to, using power switch 410 to turn off and on the power to IoT device 301, a smart switch and/or a smart outlet can be used to turn off and on the power to IoT device 301 to prove physical possession of IoT device 301. For example, IoT device 301 can be coupled to a smart switch and/or a smart outlet (not shown) that can control the power to IoT device 301. In this example, IoT device 301 can be downstream of the smart switch and/or the smart outlet. In some examples, possession determination system 414 of IoT device 301 can determine the number and/or duration of off/on cycles created by the smart switch and/or smart outlet to determine physical possession of IoT device 301. In some examples, possession determination system 414 can determine physical possession of IoT device 301 by determining that the instructions in the message to user device 307 were satisfied when the power to IoT device 301 is turned off and on using the smart switch and/or the smart outlet.

In another exemplary embodiment, a downstream device can request an upstream device to control the power to the downstream device. In this example, the physical possession of the upstream device can be determined. For example, IoT device 301 is coupled to another IoT device (e.g., a smart switch, a smart outlet, or other IoT devices) such that IoT device 301 is downstream of the other IoT device, and the other IoT device can control the power to IoT device 301. In this example, the object is to determine the physical possession of the other IoT device (the upstream IoT device). In this example, IoT device 301 and the other IoT device can communicate with each other. For example, both are on the same mesh network (e.g., can communicate through a WLAN). IoT device 301 can send a message to other IoT device to turn off and on the power to IoT device 301 once or multiple times. Possession determination system 414 can determine if the other IoT device follows the instructions in the message. If the other IoT device follows the instructions, possession determination system 414 can determine the physical possession of the other IoT device. For example, possession determination system 414 can determine the other IoT device and IoT device 301 are physically possessed by the same user.

In another exemplary embodiment, an upstream IoT device can determine physical possession of a downstream IoT device. For example, the upstream IoT device (e.g., a smart switch) that provides power to the downstream IoT device (e.g., a smart bub) can detect the current being used the downstream IoT device. By detecting the current, the upstream IoT device can detect the downstream IoT device, determine that the IoT downstream device is part of the IoT network, and/or determine the physical possession of the downstream IoT device. For example, the upstream IoT device can determine that the downstream IoT device has the same physical possession as the upstream IoT device. In another example, the upstream IoT device (e.g., a smart switch) that provides power to the downstream IoT device (e.g., a smart bub) can detect a correlation between removing power to the downstream IoT device and the downstream IoT device being off the IoT network. By detecting the correlation, the upstream IoT device can detect the downstream IoT device, determine that the IoT downstream device is part of the IoT network, and/or determine the physical possession of the downstream IoT device. For example, the upstream IoT device can determine that the downstream IoT device has the same physical possession as the upstream IoT device. In some examples, the above embodiments can be used for automatic addition and/or replacement of downstream IoT devices in the IoT network.

According to some embodiments, turning off and on IoT device 301 can be based on predetermined information (e.g., predetermined approach(es)) that is shared between IoT device 301 and user device 307. In some examples, the predetermined information can be shared between IoT device 301 and user device 307 by system server 305. System server 305 can store and manage the user account associated with IoT device 301.

Figure 5A:
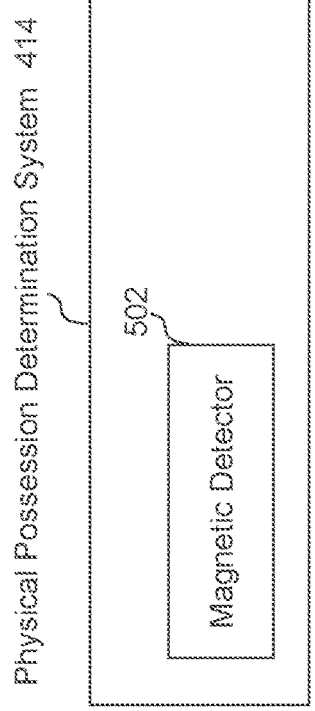
FIGS. 5A-5I illustrate exemplary block diagrams of possession determination system, according to some embodiments

According to some embodiments, one approach to prove physical possession of IoT device 301 can include using one or more magnetic detectors. FIG. 5A illustrates a block diagram of possession determination system 414 having one or more magnetic detectors 502, according to some embodiments. Possession determination system 414 can include one or more magnetic detectors 502 configured to detect the presence of a magnet. In a non-limiting example, magnet detector 502 can include a magnetometer that can measure, for example, strength and/or direction of a magnetic field. However, magnetic detector 502 can include any other sensors configured to detect the presence of a magnet and/or measure its magnetic field. In some examples, magnetic detector 502 can generate a signal based on the detection of the presence of the magnet. Possession determination system 414 can measure the generated signal and determine the physical possession of IoT device 301. For example, a user of IoT device 301 can hold a magnet close to IoT device 301. Magnetic detector 502 can generate a signal (e.g., an electric signal) based on detecting the presence of the magnet. If a parameter of the generated signal meets a condition (e.g., a power of the signal is greater than a threshold), possession determination system 414 can determine that the user has physical possession of IoT device 301.

In some examples, the user brings the magnet in close proximity of IoT device 301 during (or after) the boot operation of IoT device 301. Additionally, or alternatively, the user can bring the magnet in close proximity of IoT device 301 at any time during the operation of IoT device 301. In some examples, IoT device 301 (e.g., using possession determination system 414) can send a message to the user (e.g., through user device 307) to prompt the user to bring the magnet in close proximity of IoT device 301.

Figure 5B:
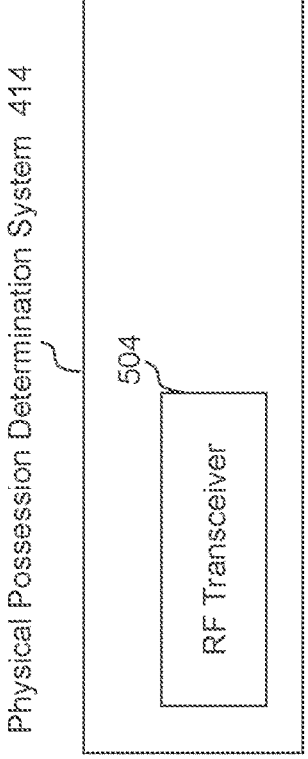

According to some embodiments, one approach to prove physical possession of IoT device 301 can include using one or more RF transceivers. FIG. 5B illustrates a block diagram of possession determination system 414 having one or more transceivers 504, according to some embodiments. Although transceiver 504 is illustrated in FIG. 5B as part of possession determination system 414, transceiver 504 can be (or be part of) transceiver 412 of FIG. 4. According to some embodiments, transceiver 504 can be one or more of a WLAN subsystem, a Bluetooth™ subsystem, or the like. For example, possession determination system 414 (and/or IoT device 301) can communicate with user device 307 using WLAN (e.g., WiFi) and/or Bluetooth™. In some examples, transceiver 504 can be configured to operate using low power RF signals. In this case, user device 307 can be close to IoT device 301 to be able to correctly receive and decode the signals from possession determination system 414 (and/or IoT device 301).

In a non-limiting example, possession determination system 414 can transmit one or more packets (e.g., RF packets) to user device 307 using, for example, transceiver 504. The one or more packets can be predetermined packets used by possession determination system 414 to determine the physical possession of IoT device 301. In some embodiments, after receiving the packets, user device 307 can send one or more response packets (e.g., RF packets) back to IoT device 301. After receiving the response packets, possession determination system 414 can determine whether the user of user device 307 has physical possession of IoT device 301 based on the transmitted and/or received packets. In a non-limiting example, possession determination system 414 can compare the received packets with the predetermined packet to determine whether the user of user device 307 has physical possession of IoT device 301. The predetermined packets can be stored in storage/buffers 408.

Additionally, or alternatively, after receiving the packets from IoT device 301, user device 307 can communicate the received packets (or a subset of the packets or one or more response packets) with system servers 305. System servers 305 can communicate with possession determination system 414 of IoT device 301 to confirm the physical possession of IoT device 301 by the user of user device 307.

In a non-limiting example, user device 307 can be or can include a dongle. For example, user device 307 can be an RF transceiver dongle (for example, but not limited to, a WLAN dongle, a Bluetooth™ dongle, or the like) that can communicate with IoT device 301 for determining physical possession of IoT device 301.

According to some embodiments, predetermined packet(s) can be based on predetermined information that is shared between IoT device 301 and user device 307. In some examples, the predetermined information can be shared between IoT device 301 and user device 307 by system server 305. System server 305 can store and manage the user account associated with IoT device 301.

According to some embodiments, one approach to prove physical possession of IoT device 301 can include using one or more QR codes or other printed secrets on IoT device 301. In this example, IoT device 301 can include one or more QR codes that can be physically located on IoT device 301. Although some examples are discussed with respect to QR codes, the embodiments of this disclosure are not limited to these examples, and instead other device-specific secrets/codes can be used. In a non-limiting example, to determine physical possession of IoT device 301, a user can use user device 307 to scan the QR code of the IoT device 301. After scanning the QR code, user device 307 can determine identifying information associated with IoT device 301 and a device-specific secret associated with IoT device 301, according to some embodiments.

User device 307 can communicate one or more of the identifying information and the device-specific secret associated with IoT device 301 to, for example, IoT device 301 and/or system servers 305 to prove the user's physical possession of IoT device 301. In one example, system servers 305 can determine the user's physical possession of IoT device 301 based on the received information from user device 307. System servers 305 can communicate the determination of the user's physical possession of IoT device 301 to, for example, possession determination system 414 of IoT device 301. In another example, user device 307 can directly communicate with IoT device 301 (e.g., through network 303) to prove physical possession of IoT device 301.

According to some embodiments, predetermined code can be based on predetermined information that is shared between IoT device 301 and user device 307. In some examples, the predetermined information can be shared between IoT device 301 and user device 307 by system server 305. System server 305 can store and manage the user account associated with IoT device 301.

Figure 5C:
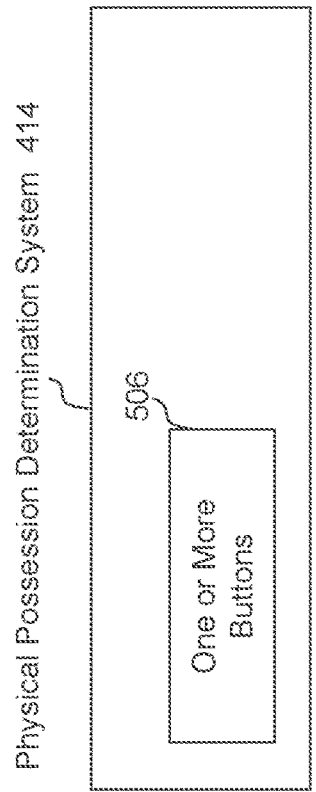

According to some embodiments, one approach to prove physical possession of IoT device 301 can include using one or more buttons or switches on IoT device 301. FIG. 5C illustrates a block diagram of possession determination system 414 having one or more buttons 506, according to some embodiments. Buttons 506 can include, but are not limited to, switches, capacitive touch switches, capacitive touch buttons, or the like. However, the embodiments of this disclosure are not related to these examples, and buttons 506 can include other sensors. For example, buttons 506 can include other sensors (e.g., touch sensors) to measure, for example, the presence of a user's touch.

In a non-limiting example, IoT device 301 (e.g., using possession determination system 414) and/or system servers 305 can request the user to actuate one or more buttons 506. In one example, IoT device 301 can include a user interface for requesting the user to actuate one or more buttons 506. In this example, the request can be displayed on the user interface, can be sent using a sound system, or the like. Additionally, or alternatively, IoT device 301 (e.g., using possession determination system 414) and/or system servers 305 can send the request to user device 307. IoT device 301 can send the request to user device 307 directly (e.g., through network 303) and/or through system servers 305. In response to the request, the user can actuate one or more buttons 506. If possession determination system 414 determines that one or more buttons 506 are actuated in response to the request that was sent to the user, possession determination system 414 can determine that the user has physical possession of IoT device 301.

According to some embodiments, the process of actuating one or more buttons 506 can include actuating a single button once. Additionally, or alternatively, different approaches of actuating buttons 506 can be used for determining physical possession. In a non-limiting example, the user is to actuate (e.g., press) a single button for at least a predetermined period of time to determine physical possession. In another non-limiting example, the user is to actuate (e.g., press) a single button at least a predetermined number of times to determine physical possession. In another non-limiting example, the user is to actuate (e.g., press) multiple buttons in a predetermined manner, for at least a predetermined period of time, and/or at least a predetermined number of times to determine physical possession. Depending on the scheme used, possession determination system 414 can determine if the user has successfully met the condition(s) of the scheme and determine if the user has physical possession of IoT device 301.

According to some embodiments, predetermined approaches for actuating the button(s) can be based on predetermined information that is shared between IoT device 301 and user device 307. In some examples, the predetermined information can be shared between IoT device 301 and user device 307 by system server 305. System server 305 can store and manage the user account associated with IoT device 301.

Figure 5D:
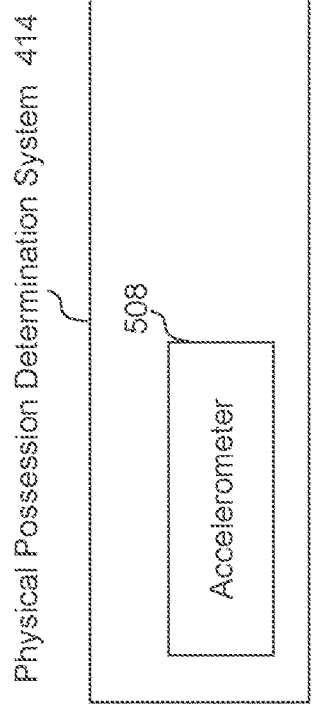

According to some embodiments, one approach to prove physical possession of IoT device 301 can include using one or more accelerometers in IoT device 301. FIG. 5D illustrates a block diagram of possession determination system 414 having accelerometer 508, according to some embodiments. Accelerometer 508 can be configured to measure acceleration forces to IoT device 301. According to some embodiments, possession determination system 414 can determine a users' physical possession based on acceleration force applied by the user to IoT device 301. In a non-limiting example, the acceleration force can be applied during the boot operation of IoT device 301. In another non-limiting example, the acceleration force can be applied during normal operation of IoT device 301.

In some examples, the acceleration force can be applied without IoT device 301 prompting the user to apply the force. Additionally, or alternatively, IoT device 301 (and/or system servers 305) can prompt the user to apply the acceleration force. In a non-limiting example, IoT device 301 (e.g., using possession determination system 414) and/or system servers 305 can request the user to apply the acceleration force. In one example, IoT device 301 can include a user interface for requesting the user to apply the acceleration force. In this example, the request can be displayed on the user interface, can be sent using a sound system, or the like. Additionally, or alternatively, IoT device 301 (e.g., using possession determination system 414) can send the request to user device 307. IoT device 301 can send the request to user device 307 directly (e.g., through network 303) and/or through system servers 305. In response to the request, the user can apply the acceleration force.

If possession determination system 414 senses (e.g., measures) the acceleration force using accelerator 508, possession determination system 414 can determine that the user has physical possession of IoT device 301. In some examples, the acceleration force is in response to a request from IoT device 301 (and/or system servers 305). In some examples, the acceleration force is applied without any request form IoT device 301 (and/or system servers 305).

According to some embodiments, using the accelerometer can be based on predetermined information that is shared between IoT device 301 and user device 307. In some examples, the predetermined information can be shared between IoT device 301 and user device 307 by system server 305. System server 305 can store and manage the user account associated with IoT device 301.

Figure 5E:
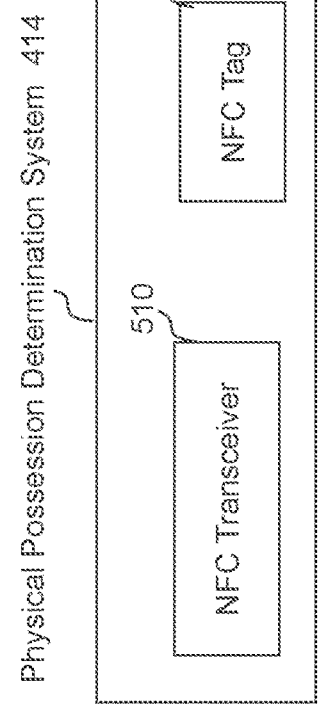

According to some embodiments, one approach to prove physical possession of IoT device 301 can include using one or more near-field communication (NFC) transceivers and/or one or more NFC tags in IoT device 301. FIG. 5E illustrates a block diagram of possession determination system 414 having NFC transceiver 510 and NFC tag 512, according to some embodiments. Although NFC transceiver 510 is illustrated within possession determination system 414 in FIG. 5E, NFC transceiver 510 can be (or be part of) transceiver 412 of FIG. 4. According to some embodiments, NFC transceiver 510 can be a transceiver configured to operate based on NFC communication protocols.

According to some embodiments, NFC tag 512 can include digitized information configured to be read by an NFC reader. NFC tag 512 can include the digitized information embedded in a tag that can be powered using inductive coupling. A user can use user device 307, which can be or can include an NFC reader, with NFC tag 512 to prove the user's physical possession of IoT device 301. In a non-limiting, to determine physical possession of IoT device 301, a user can use user device 307 to scan or read the NFC tag 512. After scanning NFC tag 512, user device 307 can determine identifying information associated with IoT device 301 and a device-specific secret associated with IoT device 301, according to some embodiments.

User device 307 can communicate one or more of the identifying information and the device-specific secret associated with IoT device 301 to, for example, IoT device 301 and/or system servers 305 to prove the user's physical possession of IoT device 301. In one example, system servers 305 can determine the user's physical possession of IoT device 301 based on the received information from user device 307. System servers 305 can communicate the determination of the user's physical possession of IoT device 301 to, for example, possession determination system 414 of IoT device 301. In another example, user device 307 can directly communicate with IoT device 301 (e.g., through network 303) to prove physical possession of IoT device 301.

In addition to, or alternative to, NFC tag 512, possession determination system 414 can include NFC transceiver 510 for communicating with user device 307. In one example, a two-way communication between NFC transceiver 510 and user device 307 can be established to determine the physical possession of IoT device 301 by the user of user device 307. The two-way communication can include an NFC peer-to-peer communication for exchanging information in, for example, an ad hoc manner. In a non-limiting example, NFC transceiver 510 can send a first message (e.g., one or more NFC packets) to user device 307. In response, user device 307 can send a second message (e.g., one or more NFC packets) to NFC transceiver 510. After examining the second message, possession determination system 414 can determine that the user of user device 307 has physical possession of IoT device 301. In a non-limiting example, possession determination system 414 can compare the received NFC packets with one or more predetermined packets (and/or with transmitted NFC packets) to determine whether the user of user device 307 has physical possession of IoT device 301. The predetermined packets can be stored in storage/buffers 408.

Additionally, or alternatively, after receiving the NFC packet from IoT device 301, user device 307 can communicate the second message (e.g., one or more NFC packets) with system servers 305 to provide that the user of user device 307 has physical possession of IoT device 301. System servers 305 can communicate the determination of physical possession to IoT device 301, according to some examples.

According to some embodiments, the NFC packets and/or the NFC tag can be based on predetermined information that is shared between IoT device 301 and user device 307. In some examples, the predetermined information can be shared between IoT device 301 and user device 307 by system server 305. System server 305 can store and manage the user account associated with IoT device 301.

Figure 5F:
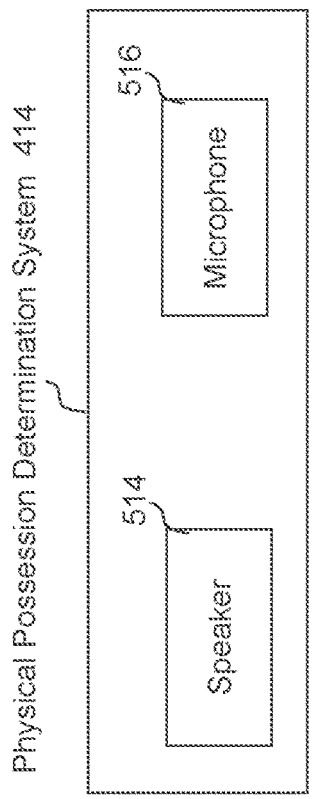

According to some embodiments, one approach to prove physical possession of IoT device 301 can include using one or more speakers and/or one or more microphones in IoT device 301. FIG. 5F illustrates a block diagram of possession determination system 414 having speaker 514 and/or microphone 516, according to some embodiments. Speaker 514 and/or microphone 516 can be (or be part of) sensor 402 of FIG. 4.

According to some embodiments, user device 307 can send an audio signal to IoT device 301 to prove the user's physical possession of IoT device 301. For example, a predetermined audio signal is used to determine physical possession by possession determination system 414. User device 307 can send the predetermined audio signal to IoT device 301. User device 307 can send the audio signal in response to a request from IoT device 301 and/or system servers 305, in some examples. Additionally, or alternatively, user device 307 can send the audio signal without any request from IoT device 301 and/or system servers 305. Microphone 516 can receive the audio signal.

In some examples, possession determination system 414 can compare the received audio signal with the predetermined audio signal that can be stored in, for example, storage/buffers 408. Additionally, or alternatively, possession determination system 414 can determine information associated with the received audio signal, and can compare the determined information with predetermined information. If the received audio signal matches the predetermined audio signal (or the determined information matches the predetermined information), possession determination system 414 can determine that the user of user device 307 has physical possession of IoT device 301.

According to some embodiments, IoT device 301 can send an audio signal to user device 307 for proving the user's physical possession of IoT device 301. For example, a predetermined audio signal is used to determine physical possession by possession determination system 414. Speaker 514 with possession determination system 414 can generate and transmit the predetermined audio signal. User device 307 can receive the audio signal from IoT device 301. In some examples, speaker 514 can send the audio signal in response to a process for determining physical possession being initiated. After receiving the audio signal, user device 307 can compare the received audio signal with the predetermined audio signal stored in, for example, user device 307. Additionally, or alternatively, user device 307 can determine information associated with the received audio signal, and can compare the determined information with predetermined information. If the audio signals match (or the determined information matches the predetermined information), user device 307 can send a message to IoT device 301 and/or system servers 305 to indicate that the audio signals have matched, according to some embodiments. Based on the message, possession determination system 414 can determine that the user of user device 307 has physical possession of IoT device 301.

According to some embodiments, the predetermined information is shared between IoT device 301 and user device 307. In some examples, the predetermined information can be shared between IoT device 301 and user device 307 by system server 305. System server 305 can store and manage the user account associated with IoT device 301.

Figure 5G:
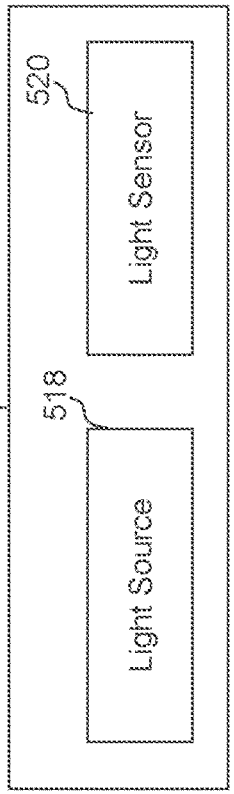

According to some embodiments, one approach to prove physical possession of IoT device 301 can include using one or more light sources and/or one or more light sensors in IoT device 301. FIG. 5G illustrates a block diagram of possession determination system 414 having light source 518 and/or light sensor 520, according to some embodiments. Light source 518 and/or light sensor 520 can be (or be part of) sensor 402 of FIG. 4, according to some embodiments. Light source 518 can include any light source such as, but not limited to, infrared (IR) light source, visible light source, laser source, or the like. Similarly, light sensor 520 can include any sensor or detector configured to detect light such as, but not limited to, IR light, visible light, laser, or the like.

In a non-limiting example, light sensor 520 can include a visible light sensor. To determine physical possession of IoT device 301, user device 307 can be configured to generate and emit a signal (e.g., visible light) toward IoT device 301. Light sensor 520 can detect the signal (e.g., the visible light) form user device 307. Possession determination system 414 can use the detected signal (e.g., the visible light) to determine physical possession of IoT device 301 by the user of user device 307. In a non-limiting example, user device 307 can generate and emit the signal (e.g., the visible light) toward IoT device 301 in response to a request from IoT device 301 and/or system servers 305. In another non-limiting example, the signal (e.g., the visible light) generated and emitted by user device 307 can be based on predetermined information. After detecting the signal at light sensor 520, possession determination system 414 can compare the information associated with the detected signal with the predetermined information stored in IoT device 301 (e.g., in storage/buffers 408). If the detected information match with the predetermined information, possession determination system 414 can determine that the user of user device 307 has physical possession of IoT device 301.

In a non-limiting example, light sensor 520 can include an IR sensor. To determine physical possession of IoT device 301, user device 307 can be configured to generate and emit a signal (e.g., IR light) toward IoT device 301. Light sensor 520 can detect the signal (e.g., the IR light) form user device 307. Possession determination system 414 can use the detected signal (e.g., the IR light) to determine physical possession of IoT device 301 by the user of user device 307. In one example, user device 307 can generate and emit the signal (e.g., the IR light) toward IoT device 301 in response to a request from IoT device 301 and/or system servers 305. In another example, the signal (e.g., the IR light) generated and emitted by user device 307 can be based on predetermined information. After detecting the signal at light sensor 520, possession determination system 414 can compare the information associated with the detected signal with the predetermined information stored in IoT device 301 (e.g., in storage/buffers 408). If the detected information match with the predetermined information, possession determination system 414 can determine that the user of user device 307 has physical possession of IoT device 301. In a non-limiting example, user device 307 can include a remote control device (e.g., remote control 110 of FIG. 1) configured to generated the signal (e.g., the IR light) based on the predetermined information. For example, the remote control device can include a button used for proving (and controlling/configuring) IoT device 301.

In a non-limiting example, light source 518 can generate and emit a signal (e.g., visible light, IR light, laser, or the like). In one example, light source 518 can include a light emitting diode (LED). However, the embodiments of this disclosure can include other light sources. To determine physical possession of IoT device 301, user device 307 can be configured to receive the signal (e.g., capture the visible light, the IR light, the laser, or the like). In some examples, the signal is generated based on predetermined information. The predetermined information can include a code associated with IoT device 301. In one example, user device 307 can include a light sensor (e.g., a camera, an IR sensor, or the like) to receive and capture the signal from IoT device 301. In another example, user device 307 can include a dongle connected to user device 307. The dongle can include a light sensor (e.g., a camera, an IR sensor, or the like) to receive and capture the signal from IoT device 301. After receiving the signal from IoT device 301, user device 307 can determine information (e.g., a code) from the received signal. In one example, user device 307 can communicate the determined information (e.g., the determined code) back to IoT device 301 directly and/or through system servers 305 to prove that the user of user device 307 has physical possession of IoT device 301. Additionally, or alternatively, user device 307 can communicate the determined information (e.g., the determined code) to system servers 305 to prove that the user of user device 307 has physical possession of IoT device 301.

In another non-limiting example, IoT device 301 can use both light source 518 and light sensor 520 for proving physical possession of IoT device 301. In this example, the user can prove its physical possession of IoT device 301 by using a reflective device. For example, light source 518 can generate and emit a signal (e.g., visible light, IR light, laser, or the like). The signal can be based on predetermined information (e.g., a predetermined code) associated with IoT device 301. If the user uses the reflective device in the proximity of IoT device 301, light sensor 520 can receive and capture the reflected signal (e.g., reflected visible light, reflected IR light, reflected laser, or the like) reflected from the user's reflective device. Possession determination system 414 can determine information (e.g., a code) from the captured signal and compare the determined information (e.g., the determined code) with the stored predetermined information (e.g., predetermined code stored in, for example, storage/buffers 408). If the determined information (e.g., the determined code) and the predetermined information (e.g., predetermined code) match, possession determination system 414 can determine that the user has physical possession of IoT device 301.

According to some embodiments, the predetermined information is shared between IoT device 301 and user device 307. In some examples, the predetermined information can be shared between IoT device 301 and user device 307 by system server 305. System server 305 can store and manage the user account associated with IoT device 301.

Figure 5H:
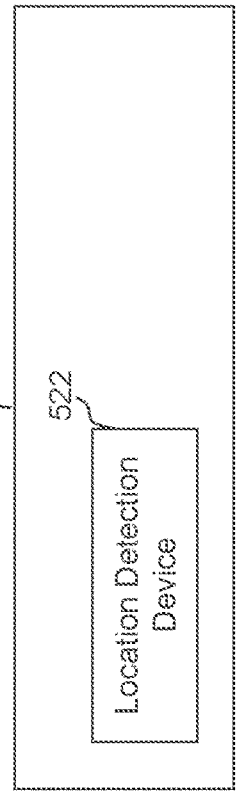

According to some embodiments, one approach to prove physical possession of IoT device 301 can include using the location of IoT device 301. FIG. 5H illustrates a block diagram of possession determination system 414 having location detection device 522, according to some embodiments. Location detection device 522 can be (or be part of) sensor 402 of FIG. 4, according to some embodiments. Location detection device 522 can include global navigation satellite systems (GNSS) device such as a global positioning system (GPS). However, the embodiments of this disclosure are not limited to these examples and location detection device 522 can include any other systems configured to determine and provide a location of IoT device 301. In a non-limiting example, location detection device 522 can determine and provide the location of IoT device 301 with an accuracy of about 1 m, about 1 cm, about 1 mm, or any other accuracy.

In some embodiments, possession determination system 414 can use the determined location of IoT device 301 from location detection device 522 and location information associated with the user of IoT device 301 to determine the user's physical possession of IoT device 301. In a non-limiting example, IoT device 301 is to be used with a physical property associated with the user. Possession determination system 414 (alone or with system servers 305) can determine location information associated with the user's property. Possession determination system 414 can compare the determined location information associated with the user's property with the determined location information of IoT device 301 form location detection device 522. If the location information match, possession determination system 414 can determine the user's physical possession of IoT device 301.

In a non-limiting example, possession determination system 414 can periodically check the location information of IoT device 301 from location detection device 522. If possession determination system 414 determines that location information of IoT device 301 does not anymore match the location information associated with the user of IoT device 301, possession determination system 414 can disable IoT device 301. By doing so, possession determination system 414 can ensure that IoT device 301 is operating in the appropriate environment.

According to some embodiments, one approach to prove physical possession of IoT device 301 can include proving the user's knowledge of a password associated with the network to which IoT device 301 is connected to. IoT device 301 can be connected to network 303 of FIG. 3. In a non-limiting example, network 303 can include, but is not limited to, a WLAN (e.g., a WiFi network) that is protected using a password. In this example, a user can be prompted by IoT device 301 and/or system servers 305 to provide the password associated with network 303. Possession determination system 414 of IoT device 301 (and/or system servers 305) can compare the entry provided by the user to the password associated with network 303. If matched, possession determination system 414 of IoT device 301 (and/or system servers 305) can determine the user's physical possession of IoT device 301.

In another example, possession determination system 414 of IoT device 301 (and/or system servers 305) can determine that user device 307 is also connected to network 303 using the password associated with network 303. In this example, possession determination system 414 of IoT device 301 (and/or system servers 305) can determine that the user has the correct password, and therefore, has physical possession of IoT device 301.

This example can provide added security when a user tries to take over existing IoT devices that are in communication with a network (e.g., using an access point of the network).

Figure 5I:
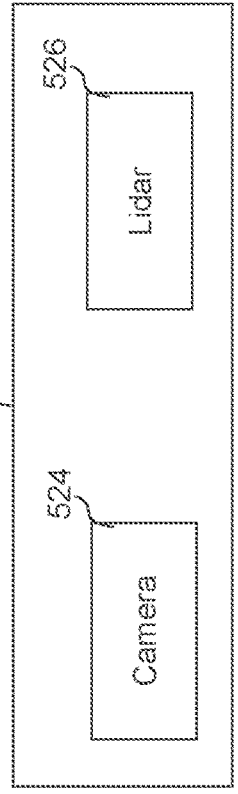

According to some embodiments, one approach to prove physical possession of IoT device 301 can include using one or more cameras and/or one or more light detection and ranging (lidar) devices of IoT device 301. FIG. 5I illustrates a block diagram of possession determination system 414 having camera 524 and/or lidar 526, according to some embodiments. Camera 524 and/or lidar 526 can be (or be part of) sensor 402 of FIG. 4, according to some embodiments.

In some examples, possession determination system 414 can use camera 524 and image or video recognition methods to detect an image or video from a user to determine the user's physical possession of IoT device 301. In a non-limiting example, the user can use its user device 307 to display an image to IoT device 301. Using camera 524, possession determination system 414 can capture the image, process it, and compare it with a predetermined image (stored in, for example, storage/buffer 408). If the captured and predetermined images match, possession determination system 414 can determine that the user has physical possession of IoT device 301. However, the embodiments of this disclosure are not limited to these examples and other images and/or videos from the user can be used to determine the user's physical possession of IoT device 301.

In some examples, possession determination system 414 can use lidar 526 and image, video, or gesture recognition methods to detect, for example, a gesture from a user to determine the user's physical possession of IoT device 301. In a non-limiting example, the user can provide a gesture to IoT device 301. Using lidar 526, possession determination system 414 can capture the gesture, process it, and compare it with a predetermined gesture (stored in, for example, storage/buffer 408). If the captured and predetermined gestures match, possession determination system 414 can determine that the user has physical possession of IoT device 301. However, the embodiments of this disclosure are not limited to these examples and other gestures from the user can be used to determine the user's physical possession of IoT device 301. For example, absence or presence of an object can be used as the gesture.

In some examples, IoT device 301 and/or system servers 305 can trigger (e.g., by sending a request to) the user and/or the user device to display the image, the video, the gesture, or the like.

According to some embodiments, the image, the video, the gesture, or the like can be based on predetermined information that is shared between IoT device 301 and user device 307. In some examples, the predetermined information can be shared between IoT device 301 and user device 307 by system server 305. System server 305 can store and manage the user account associated with IoT device 301.

Although some exemplary embodiments are discussed above with respect to possession determination system 414 determining the physical possession of IoT device 301, these embodiments can additionally (or alternatively) be performed by system servers 305. In other words, a user can prove its physical possession of IoT device 301 with system servers 305 using, for example, one or more embodiments discussed above. The user can apply other approaches to establish trust with system servers 305 allowing the user to take over IoT devices 301. In some examples, to prove its physical possession of IoT device 301, user can provide identifying information associated with IoT device 301 to system servers 305. The identifying information associated with IoT device 301 can include, but is not limited to, QR code, medium access control (MAC) address, or the like associated with IoT device 301.

According to some embodiments, a user can identify one or more IoT devices 301 using, for example, user device 307. In some examples, identifying IoT devices 301 can be used in setting up IoT devices 301, in naming IoT devices 301, in replacing IoT devices 301, in removing IoT devices 301, in proving physical possession, or the like. In some examples, user device 307 can include a user interface (UI) for configuring, controlling, and/or operating IoT devices 301. For example, user 332 can use the UI of user device 307 to configure, control, and/or operate IoT devices 301. The UI of user device 307 can be associated with the user account of the user of user device 307. In one example, user 332 can use the UI of user device 307 to directly (e.g., through network 303) configure, control, and/or operate IoT devices 301. Additionally, or alternatively, user 332 can use the UI of user device 307 to configure, control, and/or operate IoT devices 301 through system servers 305.

In one example, identifying IoT device 301 can include triggering IoT device 301 to generate and emit light. For example, the user can use the UI of user device 307 to select IoT device 301*a*. The selected IoT device 301*a* can emit light (e.g., using light source 518 of FIG. 5G) to identify IoT device 301*a*.

In one example, identifying IoT device 301 can include triggering IoT device 301 to generate or adjust IoT device 301's output. For example, the user can use the UI of user device 307 to select IoT device 301*a*. The selected IoT device 301*a* generates and/or changes its associated output (e.g., using actuator 406 of FIG. 4) to identify IoT device 301*a*.

In one example, identifying IoT device 301 can include triggering IoT device 301 to generate and transmit packets (e.g., RF packets). For example, the user can use the UI of user device 307 to select IoT device 301*a*. The selected IoT device 301*a* generates and transmits the packets (e.g., RF packets) using, for example, transceiver 412 of FIG. 4 and/or transceiver 504. The user can move user device 307 to receive the packets to identify IoT device 301*a*. In some examples, user device 307 can identify IoT device 301*a* based on the received power of the received packets. However, user device 307 can use other parameters associated with the received packet to IoT device 301*a*.

In one example, identifying IoT device 301 can include using the location information of IoT device 301 from, for example, location detection device 522. For example, the user can use the UI of user device 307 to select IoT device 301*a* and view the location information of IoT device 301*a*. In some examples, UI of user device 307 can visually display the location of IoT device 301*a* within, for example, the user's property.

In one example, identifying IoT device 301 can include triggering IoT device 301 to generate and transmit light (e.g., visible light, IR light, laser, or the like) using, for example, light source 518. For example, the user can use the UI of user device 307 to select IoT device 301*a*. The selected IoT device 301*a* generates and transmits light to identify IoT device 301*a*. User device 307 (alone or with a dongle) can detect the transmitted light to identify IoT device 301*a*.

In one example, identifying IoT device 301 can include triggering IoT device 301 to generate and transmit NFC packets. For example, the user can use the UI of user device 307 to select IoT device 301*a*. The selected IoT device 301*a* generates and transmits the NFC packets using, for example, transceiver 412 of FIG. 4 and/or NFC transceiver 510. The user can move user device 307 to receive the NFC packets to identify IoT device 301*a*. In some examples, user device 307 can identify IoT device 301*a* based on the received power of the received packets. However, user device 307 can use other parameters associated with the received packet to IoT device 301*a*.

In one example, identifying IoT device 301 can include triggering IoT device 301 to generate and emit sound signals using, for example, speaker 514. For example, the user can use the UI of user device 307 to select IoT device 301*a*. The selected IoT device 301*a* can generate and emit sound signals to identify IoT device 301*a*.

FIG. 6 illustrates an example method 600 for determining physical possession of a plurality of IoT devices, according to some embodiments. As a convenience and not a limitation, FIG. 6 may be described with regard to elements of FIGS. 1-5. Method 600 may represent the operation of an IoT device (e.g., IoT device 301 of FIGS. 3 and 4) and/or a system server (e.g., system servers 305 of FIG. 3) for determining physical possession of a plurality of IoT devices. Method 600 may also be performed by user device 307 of FIG. 3, device 106 of FIG. 2 and/or computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6.

According to some embodiments, IoT devices 301*a*-301*n* can be associated with IoT environment 300. IoT devices 301*a*-301*n* can also be connected to, and communicate with each other using, network 303 (e.g., a mesh network). Method 600 provides an exemplary method where by determining physical possession of one or more IoT devices, the physical possession of the plurality of IoT devices 301*a*-301*n* can be determined. In other words, by determining physical possession of a subset of IoT devices 301a-30n, the physical possession of the plurality of IoT devices 301a-301n can be determined. Therefore, if the ownership (e.g., physical possession) of IoT devices changes, by determining the physical possession of some of the IoT devices, the ownership of the plurality of IoT devices can be determined/changed. Also, if one or more IoT devices are added, changed, and/or removed, the ownership (e.g., physical possession) of IoT devices can be dynamically determined and/or changed.

At 602, physical possession of a first IoT device of the plurality of IoT devices is determined. For example, IoT device 301a and/or system server 305 can determine that a user has physical possession over IoT device 301a. In some examples, one or more embodiments discussed above with respect to, for example, FIGS. 5A-5I can be used to determine the physical possession of the first IoT device.

At 604, it is determined whether the first IoT device with the determined physical possession (e.g., IoT device 301a) satisfy a condition. For example, IoT device 301a and/or system server 305 can determine whether the first IoT device with the determined physical possession (e.g., IoT device 301a) satisfies the condition.

In one non-limiting example, the condition can include a number of IoT devices having the same determined physical possession. For example, IoT device 301a and/or system server 305 can determine the number of IoT devices having the same determined physical possession and can compare the determined number with a threshold to determine whether the condition is satisfied. In this example, if a predetermined number of IoT devices from the plurality of IoT devices have the same determined physical possession, it can be determined that the plurality of IoT devices have the same determined physical possession.

In another non-limiting example, the condition can include physical location of the IoT device(s) with the determined physical possession. For example, if the IoT devices are associated with a physical property of the user, if the physical possession of one or more IoT devices inside the physical property is determined, then the determined physical possession can be used for the plurality of IoT devices. However, if the physical possession of one or more IoT devices outside the physical property is determined, then the determined physical possession may not be used for the plurality of IoT devices.

In some examples, if a number or a percentage of the plurality of IoT devices with the determined physical possession are inside the physical property, the determined physical possession can be used for the plurality of IoT devices. In this example, determining whether the condition is satisfied (e.g., operation 604) can include determining the location of the IoT devices with the determined physical possession, determining a number of IoT devices that are inside the physical property of the user, and comparing the determined number (or a percentage of the IoT devices inside the physical property compared to the plurality of IoT devices) with a threshold number (or a threshold percentage). If the number (or the percentage) of the IoT devices inside the physical property of the user is equal or greater than the threshold number (or threshold percentage), then the determined physical possession of the IoT devices in the property can be used for the plurality of IoT devices. However, if the number (or the percentage) of the IoT devices inside the physical property of the user is less than the threshold number (or threshold percentage), then the determined physical possession may not be used for the plurality of IoT devices.

In another example, the condition can include whether the subset of the IoT devices are in a secure part of the mesh network of the IoT devices.

In another non-limiting example, the condition can include type(s) of the IoT device(s) with the determined physical possession. For example, if the IoT devices are associated with the physical property of the user, if IoT devices with the determined physical possession are one or more IoT devices that can be fixed to the physical property, then the determined physical possession can be used for the plurality of IoT devices. However, if IoT devices with the determined physical possession are one or more IoT devices that can be easily moved, then the determined physical possession may not be used for the plurality of IoT devices. In another example, if IoT devices with the determined physical possession are one or more IoT devices that are considered as devices to be set up inside of the physical property, then the determined physical possession can be used for the plurality of IoT devices. However, if IoT devices with the determined physical possession are one or more IoT devices that that are considered as devices to be set up outside of the physical property, then the determined physical possession may not be used for the plurality of IoT devices.

In another non-limiting example, the condition can include using different type(s) of determining/proving physical possession. For example, one or more parameters can be defined for applying the determined physical possession of the subset to the plurality of IoT device. The one or more parameters can include one or more type(s) of determining/proving physical possession. The types of determining/proving physical possession can include, but are not limited to, using off/on mechanisms, using QR code, using RF transceiver, using NFC transceiver, using light signals, using audio signals, using magnet, using accelerometer, or the like.

It is noted that although some exemplary conditions are provided, the embodiments of this disclosure are not limited to these examples, and can include other conditions.

If it is determined in 604 that the first IoT device with determined physical possession (e.g., IoT device 301a) does not satisfy the condition, method 600 can move to 608. At 608, physical possession of another (e.g., a second) IoT device of the plurality of IoT devices is determined. For example, IoT device 301b and/or system server 305 can determine that the user has physical possession over IoT device 301b. In some examples, one or more embodiments discussed above with respect to, for example, FIGS. 5A-5I can be used to determine the physical possession of the other IoT device.

After determining the physical possession of the other IoT device (e.g., IoT device 301b), method 600 can return to operation 604 to determine whether the IoT devices (e.g., IoT device 301a and/or 301b) with determined physical possession satisfy the condition. In some examples, operation 604 can also include determining whether the IoT devices (e.g., IoT devices 301a and/or 301b) with determined physical possession have the same physical possession. Operations 604 and 608 can continue until the condition is satisfied, according to some embodiments.

If it is determined in 604 that the first IoT device with determined physical possession (e.g., IoT device 301a) or the IoT devices (e.g., IoT devices 301a and 301b) with determined physical possession satisfy the condition, method 600 can move to 606. At 606, the physical possession of the plurality of IoT devices can be determined based on the determined physical possession of the one or more IoT devices. For example, IoT devices 301a-301n and/or system servers 305 can determine the physical possession of IoT devices 301a-301n based on at least on one of the determined possession of IoT device 301a, the determined possession of IoT device 301b, or the determined possession of IoT devices 301a and 301b. For example, if a number of IoT devices with the determined physical possession are to satisfy the condition of operation 604 to determine the physical possession of the plurality of IoT devices, the the physical possession of the plurality of IoT devices (e.g., IoT devices 301a-301n) can be determined based on the determined physical possession of the number of IoT devices (e.g., IoT devices 301a and 301b).

Example Computer System

Figure 7:
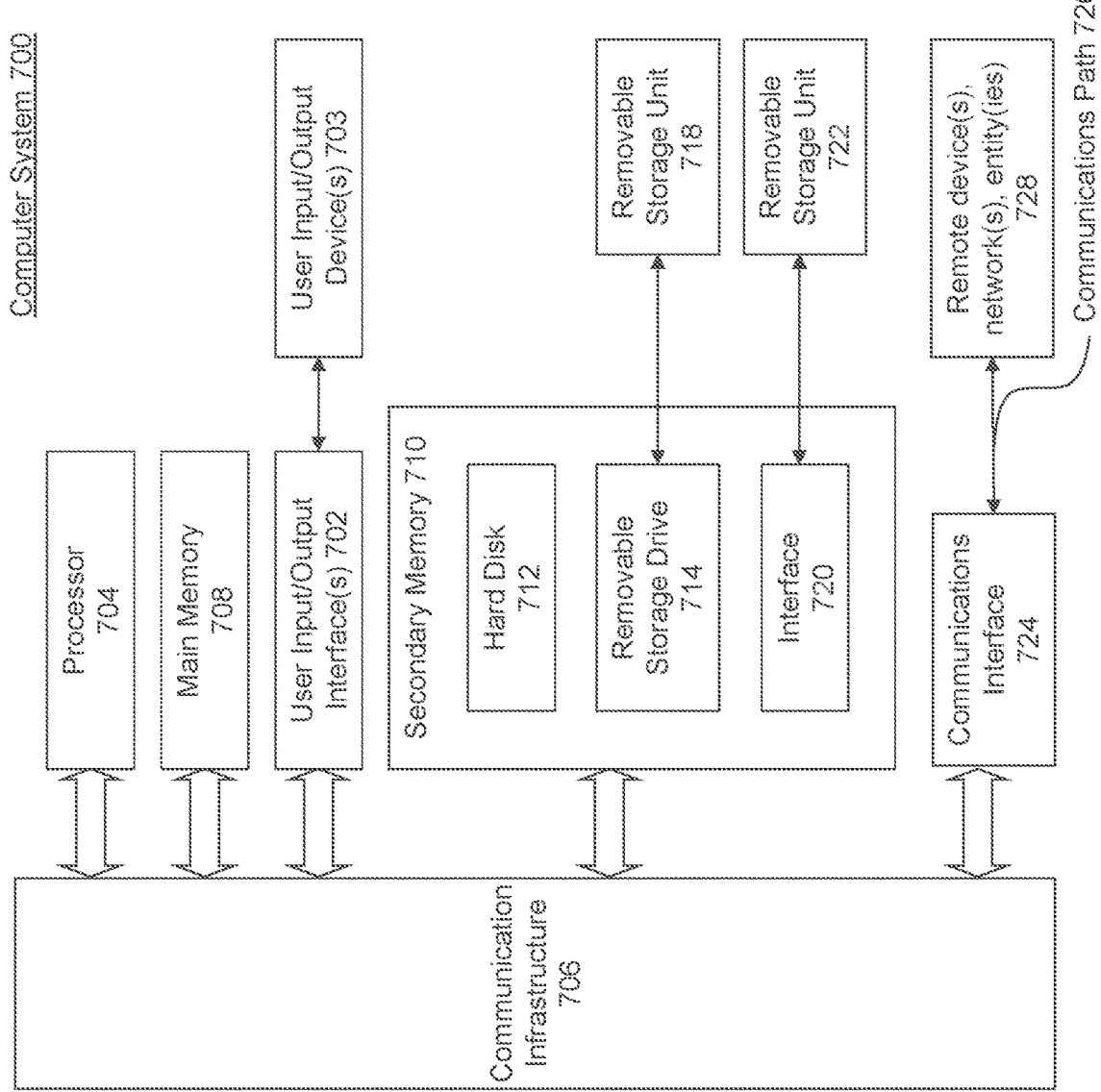
FIG. 7 illustrates an example computer system useful for implementing various embodiments.

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An Internet-of-Things (IoT) device, comprising:
a transceiver configured to communicate over a wireless network; and
a physical possession determining system configured to determine physical possession of the IoT device by at least one of:
    transmitting a first signal to a user device, the first signal generated based on predetermined information shared between the IoT device and the user device; or
    receiving a second signal from the user device, the second signal generated based on the predetermined information shared between the IoT device and the user device,
wherein the physical possession of the IoT device comprises at least one of an ownership of the IoT device or use of the IoT device based on access granted by the owner of the IoT device, and
wherein the predetermined information comprises at least one of:
    a predetermined radio frequency (RF) packet,
    information associated with a visible light signal, an infrared light signal, or a laser signal,
    information associated with an audio signal,
    a predetermined manner of actuating one or more buttons of the IoT device, or
    a predetermined manner of turning on and off a power supply associated with the IoT device.

2. The IoT device of claim 1, further comprising:
a magnetic detector configured to detect a presence of a magnet to determine the physical possession of the IoT device.

3. The IoT device of claim 1, wherein:
the first signal comprises the predetermined RF packet,
the second signal comprises a second RF packet, and
the physical possession determining system is configured to determine the physical possession of the IoT device based on the second RF packet received from the user device.

4. The IoT device of claim 1, wherein:
the second signal comprises at least one of a second audio signal, a second visible light signal, a second infrared light signal, or a second laser signal, and
the physical possession determining system is further configured to:
    determine information associated with the second signal;
    compare the information associated with the second signal with the predetermined information; and
    determine the physical possession of the IoT device based on the information associated with the second signal matching with the predetermined information.

5. The IoT device of claim 1, further comprising:
the one or more buttons,
wherein the physical possession determining system is configured to:
    determine that the one or more buttons are actuated in the predetermined manner; and
    determine the physical possession of the IoT device based on the determination that the one or more buttons are actuated in the predetermined manner.

6. The IoT device of claim 1, further comprising:
a location detection device configured to determine location information associated with the IoT device,
wherein the physical possession determining system is configured to:
    determine location information associated with a user associated with the IoT device;

compare the location information associated with the IoT device and the location information associated with the user; and
determine the physical possession of the IoT device in response to the location information associated with the IoT device matching the location information associated with the user.

7. The IoT device of claim 1, wherein the physical possession determining system is configured to:
determine that the power supply associated with the IoT device turned off and on in the predetermined manner; and
determine the physical possession of the IoT device in response to the determination that the power supply associated with the IoT device turned off and on in the predetermined manner.

8. The IoT device of claim 1, wherein the physical possession determining system is configured to:
receive a request for identifying the IoT device; and
activate at least one of a light source of the IoT device, a speaker of the IoT device, a near-field communication (NFC) transceiver of the IoT device, or an RF transceiver of the IoT device.

9. The IoT device of claim 1, further comprising:
a microphone configured to receive the second signal, the second signal comprising a second audio signal, wherein the physical possession determining system is further configured to:
determine information associated with the audio signal;
compare the information associated with the audio signal with the predetermined information; and
determine the physical possession of the IoT device based on the information associated with the audio signal matching with the predetermined information.

10. The IoT device of claim 1, further comprising:
a speaker configured to transmit the first signal, the first signal comprising the audio signal, wherein the physical possession determining system is further configured to:
receive the second signal, the second signal comprising a message indicating that information associated with the audio signal match the predetermined information; and
determine the physical possession of the IoT device based on the second signal.

11. The IoT device of claim 1, further comprising:
a light sensor configured to receive the second signal, the second signal comprising a second visible light signal, a second infrared light signal, or a second laser signal, wherein the physical possession determining system is further configured to:
determine information associated with the second visible light signal, the second infrared light signal, or the second laser signal;
compare the information associated with the second visible light signal, the second infrared light signal, or the second laser signal with the predetermined information; and
determine the physical possession of the IoT device based on the information associated with the second visible light signal, the second infrared light signal, or the second laser signal matching with the predetermined information.

12. An Internet-of-Things (IoT) device, comprising:
a transceiver configured to communicate over a wireless network; and
a physical possession determining system configured to determine physical possession of the IoT device by:
transmitting a first signal to a user device, the first signal generated based on predetermined information shared between the IoT device and the user device; and
receiving a second signal from the user device, the second signal generated based on the predetermined information shared between the IoT device and the user device,
wherein the physical possession of the IoT device comprises at least one of an ownership of the IoT device or use of the IoT device based on access granted by the owner of the IoT device, and
wherein the predetermined information comprises at least one of:
a predetermined radio frequency (RF) packet,
information associated with a visible light signal, an infrared light signal, or a laser signal,
information associated with an audio signal,
a predetermined manner of actuating one or more buttons of the IoT device, or
a predetermined manner of turning on and off a power supply associated with the IoT device.

13. The IoT device of claim 12, further comprising:
a magnetic detector configured to detect a presence of a magnet to determine the physical possession of the IoT device.

14. The IoT device of claim 12, wherein:
the first signal comprises the predetermined RF packet,
the second signal comprises a second RF packet, and
the physical possession determining system is configured to determine the physical possession of the IoT device based on the second RF packet received from the user device.

15. The IoT device of claim 12, further comprising:
a microphone configured to receive the second signal, the second signal comprising a second audio signal, wherein the physical possession determining system is further configured to:
determine information associated with the second audio signal;
compare the information associated with the second audio signal with the predetermined information; and
determine the physical possession of the IoT device based on the information associated with the second audio signal matching with the predetermined information.

16. The IoT device of claim 12, further comprising:
a speaker configured to transmit the first signal, the first signal comprising the audio signal, wherein the physical possession determining system is further configured to:
receive the second signal, the second signal comprising a message indicating that information associated with the audio signal match the predetermined information; and
determine the physical possession of the IoT device based on the second signal.

17. The IoT device of claim 12, further comprising:
a light sensor configured to receive the second signal, the second signal comprising a second visible light signal, a second infrared light signal, or a second laser signal, wherein the physical possession determining system is further configured to:

determine information associated with the second visible light signal, the second infrared light signal, or the second laser signal;

compare the information associated with the second visible light signal, the second infrared light signal, or the second laser signal with the predetermined information; and determine the physical possession of the IoT device based on the information associated with the second visible light signal, the second infrared light signal, or the second laser signal matching with the predetermined information.

18. The IoT device of claim 12, further comprising:

a light source configured to transmit the first signal, the first signal comprising the visible light signal, the infrared light signal, or the laser signal, wherein the physical possession determining system is further configured to:

receive the second signal, the second signal comprising information associated with the visible light signal, the infrared light signal, or the laser signal; and determine the physical possession of the IoT device based on the second signal.

19. The IoT device of claim 12, further comprising:

a light source configured to transmit the first signal, the first signal comprising the visible light signal, the infrared light signal, or the laser signal; and a light sensor configured to receive the second signal, the second signal comprising a reflected signal as a reflection of the visible light signal, the infrared light signal, or the laser signal, wherein the physical possession determining system is further configured to:

determine information associated with the reflected signal;

compare the information associated with the reflected signal with the predetermined information; and determine the physical possession of the IoT device based on the information associated with the reflected signal matching with the predetermined information.

20. An Internet-of-Things (IoT) device, comprising:

a transceiver configured to communicate over a wireless network; and a physical possession determining system configured to determine physical possession of the IoT device by:

transmitting a first signal to a user device, the first signal generated based on predetermined information shared between the IoT device and the user device, wherein the first signal comprises at least one of a first radio frequency (RF) packet, a first audio signal, a first visible light signal, a first infrared light signal, or a first laser signal; and receiving a second signal from the user device, the second signal generated based on the predetermined information shared between the IoT device and the user device, wherein the second signal comprises at least one of a second RF packet, a second audio signal, a second visible light signal, a second infrared light signal, or a second laser signal, wherein the physical possession of the IoT device comprises at least one of an ownership of the IoT device or use of the IoT device based on access granted by the owner of the IoT device, and wherein the predetermined information comprises at least one of:

the first RF packet, information associated with the first visible light signal, the first infrared light signal, or the first laser signal, information associated with the first audio signal, a predetermined manner of actuating one or more buttons of the IoT device, or a predetermined manner of turning on and off a power supply associated with the IoT device.

* * * * *